(12) United States Patent
Chen

(10) Patent No.: US 10,859,752 B1
(45) Date of Patent: Dec. 8, 2020

(54) BACKLIGHT FOR AN INDICATOR LAMP HAVING TWO LIGHT GUIDES WITH STAGGERED INCIDENT ENDS AND LIGHT SOURCES DISPOSED ON OUTER CIRCUMFERENCE OF THE LIGHT GUIDES

(71) Applicant: Dongguan Kangde Photoelectric Technology Co., Ltd., Guangdong (CN)

(72) Inventor: Hua Chen, Guangdong (CN)

(73) Assignee: DONGGUAN KANGDE PHOTOELECTRIC TECHNOLOGY CO., LTD., Dongguan (CN)

( * ) Notice: Subject to any disclaimer, the term of this patent is extended or adjusted under 35 U.S.C. 154(b) by 0 days.

(21) Appl. No.: 16/572,680

(22) Filed: Sep. 17, 2019

(30) Foreign Application Priority Data

Aug. 20, 2019 (CN) .......................... 2019 1 0768459

(51) Int. Cl.
F21V 8/00 (2006.01)
(52) U.S. Cl.
CPC .................... *G02B 6/004* (2013.01)
(58) Field of Classification Search
CPC .. G02B 6/0076; G02B 6/0091; G02B 6/0068; G02B 6/0073; F21Y 2115/10
See application file for complete search history.

Primary Examiner — Robert J May
(74) Attorney, Agent, or Firm — WPAT, PC

(57) ABSTRACT

The present disclosure provides a backlight module of an indicator lamp, comprising a circuit board, edge-type light sources, a first light exit structure and a second light exit structure, the edge-type light sources are electrically connected to the circuit board, the edge-type light sources are disposed at an outer circumference of light-incident ends of the first light exit structure and the second light exit structure, respectively, the edge-type light sources are used to illuminate the light-incident ends of the first light exit structure and the second light exit structure, respectively, the light-incident ends of the first light exit structure and the second light exit structure are disposed staggered, colors of the first light exit structure and the second light exit structure are different, the first light exit structure is disposed on the circuit board, the first light exit structure is provided with a first yielding hole, the first light exit structure is provided with a first bright area, the second light exit structure is disposed on the first light exit structure, the second light exit structure is provided with a second yielding hole for receiving the first bright area, and the second light exit structure is provided with a second bright area. The present disclosure, by providing the first light exit structure and the second light exit structure, slows down the consumption speed of the service life of the edge-type light sources and improves the inspection efficiency of the inspection process before shipment.

10 Claims, 3 Drawing Sheets

BACKLIGHT FOR AN INDICATOR LAMP HAVING TWO LIGHT GUIDES WITH STAGGERED INCIDENT ENDS AND LIGHT SOURCES DISPOSED ON OUTER CIRCUMFERENCE OF THE LIGHT GUIDES

CROSS-REFERENCE TO RELATED APPLICATION

The present application claims priority to Chinese Patent Application No. 201910768459.9, filed Aug. 20, 2019, the content of which is incorporated herein by reference.

FIELD OF THE DISCLOSURE

The present disclosure relates to the field of indicator lamps, and specifically to a backlight module of an indicator lamp.

BACKGROUND OF THE DISCLOSURE

An indicator lamp of a Bluetooth audio device is usually used to display a connection status of the Bluetooth, and includes a ring-shaped lamp cover and a backlight module disposed opposite thereto. A backlight module in the prior art includes a circuit board and a plurality of RGB light beads of a ring-shaped array on the circuit board. To enable consumers to visually learn about the connection status of Bluetooth, the RGB light beads generally distinguish an unconnected state from a connected state of Bluetooth by displaying red and blue.

The conventional backlight module has the following drawbacks: 1) concurrent operation of the plurality of RGB light beads quickens the consumption of the service life thereof, and shortens the maintenance cycle; 2) the RGB light beads can only display one color at a time, they need to switch different colors in an inspection process before leaving the factory to inspect normality of the light-emitting function, the inspection process cannot be completed at one time, and the inspection efficiency is low.

SUMMARY OF THE DISCLOSURE

An object of the present disclosure is to provide a backlight module of an indicator lamp, which is capable of prolonging the maintenance cycle and improving the inspection efficiency of the inspection process before shipment to solve the problems stated in the Background of the Disclosure.

To achieve the above object, the present disclosure provides the following technical solutions:

A backlight module of an indicator lamp comprises a circuit board, edge-type light sources, a first light exit structure and a second light exit structure, wherein the edge-type light sources are electrically connected to the circuit board, the edge-type light sources are disposed at the outer circumference of light-incident ends of the first light exit structure and the second light exit structure, respectively, the edge-type light sources are used to illuminate the light-incident ends of the first light exit structure and the second light exit structure, respectively, the light-incident ends of the first light exit structure and the second light exit structure are disposed staggered, colors of the first light exit structure and the second light exit structure are different, the first light exit structure is disposed on the circuit board, the first light exit structure is provided with a first yielding hole, the first light exit structure is provided with a first bright area, the second light exit structure is disposed on the first light exit structure, the second light exit structure is provided with a second yielding hole for receiving the first bright area, and the second light exit structure is provided with a second bright area.

Furthermore, the first light exit structure comprises a first light-guiding film and at least two first protrusions which are of an integral structure, the at least two first protrusions are respectively light-incident ends of the first light exit structure, the first yielding hole is provided on the first light-guiding film, the at least two first protrusions are circumferentially arrayed on the outer circumference of the first light-guiding film, outer circumferential sides of the at least two first protrusions are respectively disposed opposite to a light exit surface of the edge-type light sources, and the first bright area is a first dot area formed by a plurality of uniformly-distributed light-guiding dots.

Furthermore, the second light exit structure comprises a second light-guiding film and at least two second protrusions which are of an integral structure, the at least two second protrusions are respectively the light-incident ends of the second light exit structure, the second yielding hole is provided on the second light-guiding film, the at least two second protrusions are circumferentially arrayed on the outer circumference of the second light-guiding film, outer circumferential sides of the at least two second protrusions are respectively disposed opposite to a light exit surface of the edge-type light sources, and the second bright area is a second dot area formed by a plurality of uniformly-distributed light-guiding dots.

Furthermore, the backlight module further comprises a first light-shielding paper, the first light-shielding paper is disposed on the second light exit structure, and the first light-shielding paper is provided with a third yielding hole for receiving the second bright area.

Furthermore, the backlight module further comprises a third light exit structure, the third light exit structure is disposed between the first light exit structure and the circuit board, the light-incident ends of the first light exit structure and the second light exit structure are disposed staggered from the light-incident end of the third light exit structure, colors of the first light exit structure and the second light exit structure are both different from that of the third light exit structure, the third light exit structure is provided with a third bright area, the third bright area is located in the first yielding hole, and the edge-type light sources are disposed at the outer circumference of the light-incident ends of the third light exit structure.

Furthermore, the third light exit structure comprises a third light-guiding film and at least two third protrusions which are of an integral structure, the at least two third protrusions are respectively light-incident ends of the third light exit structure, the at least two third protrusions are circumferentially arrayed on the outer circumference of the third light-guiding film, outer circumferential sides of the at least two third protrusions are respectively disposed opposite to a light exit surface of the edge-type light sources, the third bright area is disposed on the third light-guiding film, and the third bright area is a third dot area formed by a plurality of uniformly-distributed light-guiding dots.

Furthermore, the edge-type light sources are side-emitting LED beads.

Furthermore, the circuit board is provided with a fourth yielding hole which is disposed coaxially with the first yielding hole.

Furthermore, the circuit board is provided with first bosses, top surfaces of the first bosses flush with a top surface of the second light exit structure, and the first bosses are symmetrically disposed on both sides of the light-incident end of the first light exit structure and form a first snap-fitting position, and the first bosses are symmetrically disposed on both sides of the light-incident end of the second light exit structure and form a second snap-fitting position.

Furthermore, the circuit board is provided with second bosses, top surfaces of the second bosses flush with a top surface of the second light exit structure, and the second bosses are symmetrically disposed on both sides of the light-incident end of the third light exit structure and form a third snap-fitting position.

Advantageous effects of the present disclosure are as follows:

With the light-incident ends of the first light exit structure and second light exit structure being provided, the edge-type light sources can be disposed on the outer circumference of the light-incident ends of the first light exit structure and second light exit structure, thereby reducing the thickness of the backlight module according to the present disclosure. As compared with the prior art, the edge-type light sources illuminate the light-incident ends of the first light exit structure or second light exit structure so that the first bright area or second bright area emits light and displays different colors to perform an indication function, thereby avoiding concurrent operation of all edge-type light sources, slowing down the consumption speed of the service life of the edge-type light sources and prolonging the maintenance cycle; in the inspection process before shipment, the edge-type light sources may further enable the first bright area and second bright area to emit light simultaneously by simultaneously illuminating the light-incident ends of the first light exit structure and second light exit structure, thereby achieving completion of the inspection process at one time, improving the inspection efficiency and reducing the time and costs of the manufacturer.

DETAILED DESCRIPTION OF PREFERRED EMBODIMENTS

The present disclosure will be further described with reference to the figures.

Figure 1:
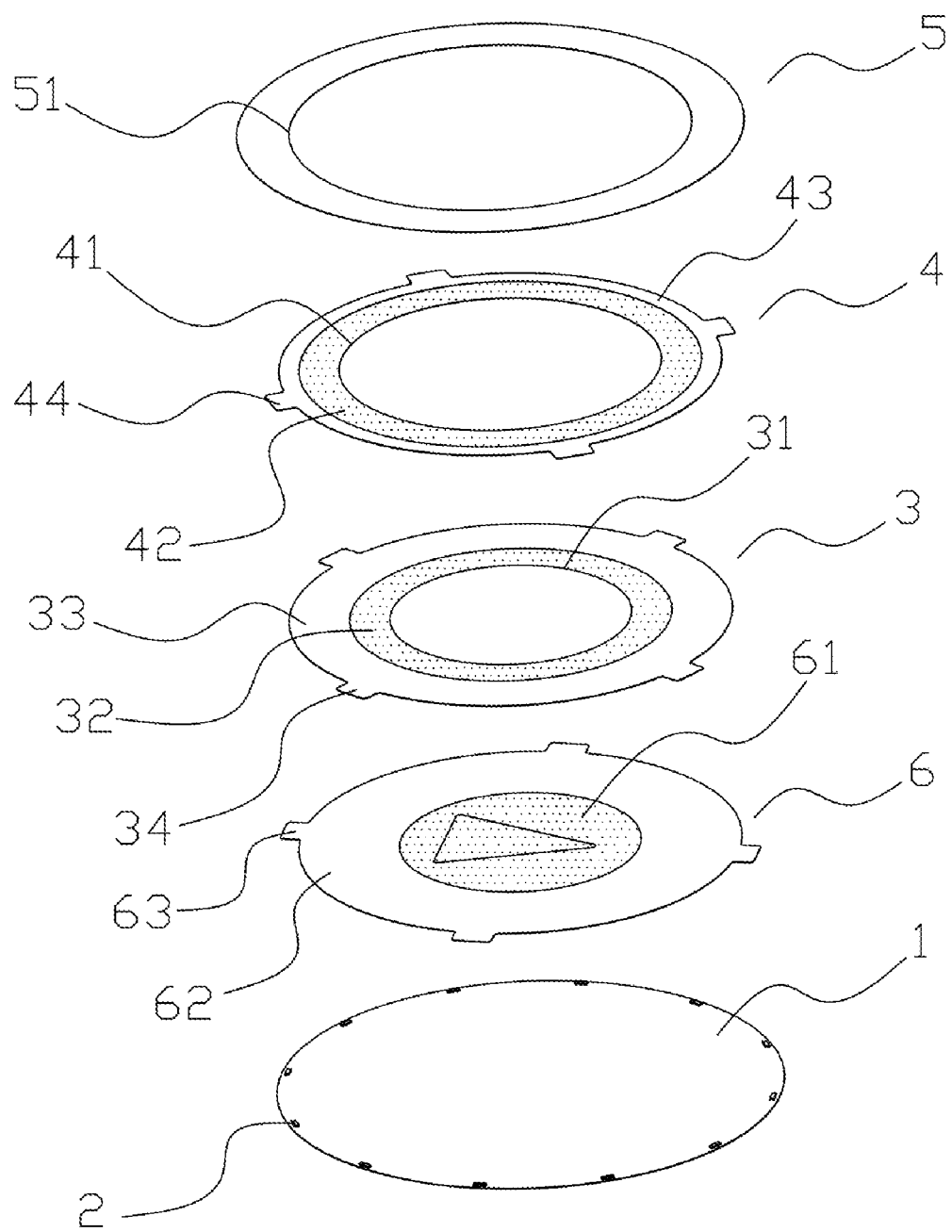
FIG. 1 is an exploded view of a backlight module of an indicator lamp according to a first embodiment of the present disclosure.
Figure 2:
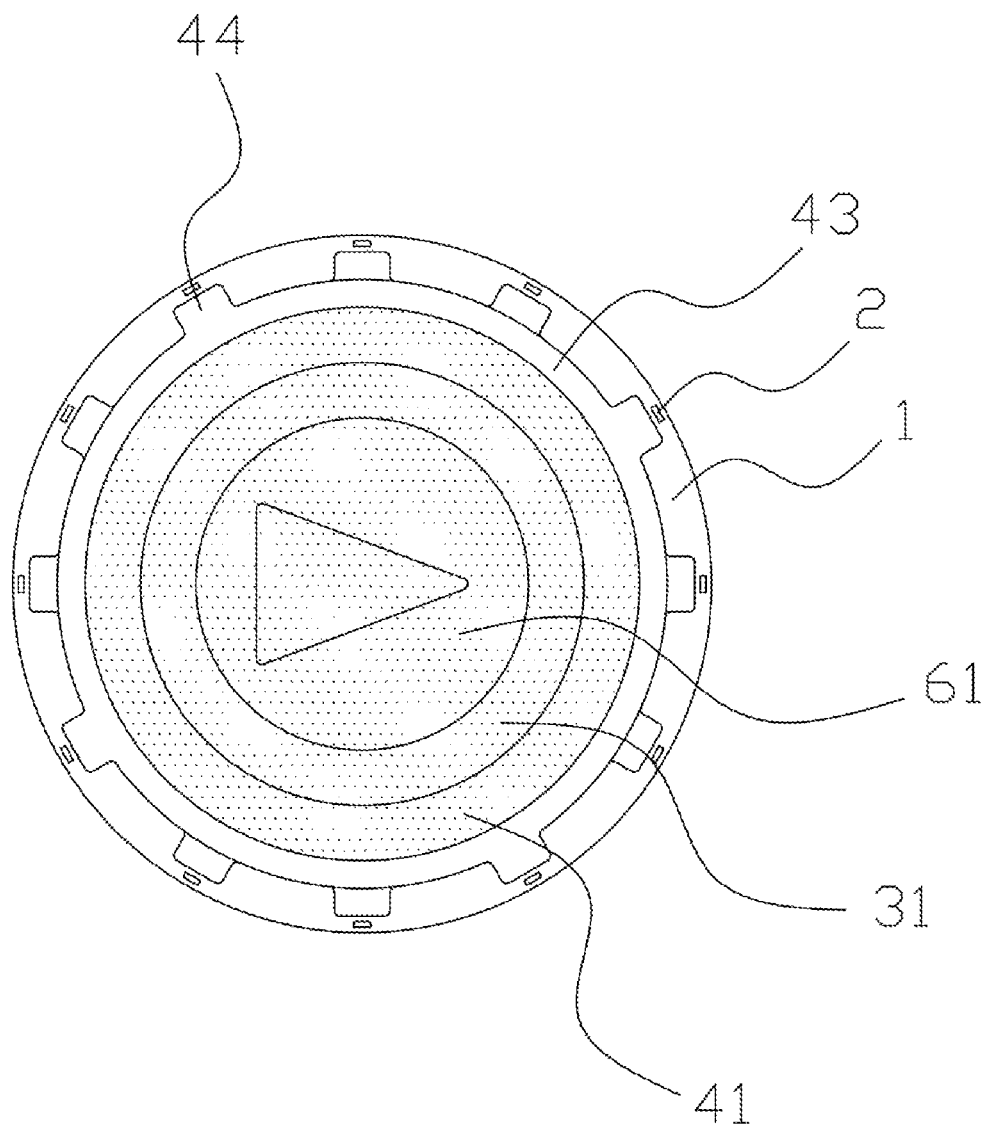
FIG. 2 is a top view of the backlight module of the indicator lamp according to the first embodiment of the present disclosure.

Referring to FIG. 1 and FIG. 2, a backlight module of an indicator lamp includes a circuit board 1, edge-type light sources 2, a first light exit structure 3 and a second light exit structure 4, wherein the edge-type light sources 2 are electrically connected to the circuit board 1, the edge-type light sources 2 are disposed at the outer circumference of light-incident ends of the first light exit structure 3 and the second light exit structure 4, respectively, the edge-type light sources 2 are used to illuminate the light-incident ends of the first light exit structure 3 and the second light exit structure 4, respectively, the light-incident ends of the first light exit structure 3 and the second light exit structure 4 are disposed staggered, colors of the first light exit structure 3 and the second light exit structure 4 are different, the first light exit structure 3 is disposed on the circuit board 1, the first light exit structure 3 is provided with a first yielding hole 31, the first light exit structure 3 is provided with a first bright area 32, the second light exit structure 4 is disposed on the first light exit structure 3, the second light exit structure 4 is provided with a second yielding hole 41 for receiving the first bright area 32, and the second light exit structure 4 is provided with a second bright area 42.

Furthermore, referring to FIG. 1 and FIG. 2, the first light exit structure 3 includes a first light-guiding film 33 and at least two first protrusions 34 of an integrally injection-molded structure, the at least two first protrusions 34 are respectively light-incident ends of the first light exit structure 3, a first double-sided adhesive layer is disposed between the first light-guiding film 33 and the circuit board 1, the first yielding hole 31 is provided on the first light-guiding film 33, the at least two first protrusions 34 are circumferentially arrayed on the outer circumference of the first light-guiding film 33, outer circumferential sides of the at least two first protrusions 34 are respectively disposed opposite to a light exit surface of the edge-type light source 2, and the first bright area 32 is a first dot area formed by a plurality of uniformly-distributed light-guiding dots.

Furthermore, a first light-blocking layer is disposed on the outer circumference of the first light-guiding film 33 (not including the outer circumference of the first protrusions 34).

Furthermore, the circuit board 1 is provided with a second double-sided adhesive layer on a side away from the first light-guiding film 33, and the backlight module according to the present disclosure is assembled in a digital product through a third double-sided adhesive layer.

Furthermore, referring to FIG. 1 and FIG. 2, the second light exit structure 4 includes a second light-guiding film 43 and at least two second protrusions 44 of an integrally injection-molded structure, the at least two second protrusions 44 are respectively the light-incident ends of the second light exit structure 4, a third double-sided adhesive layer is disposed between the second light-guiding film 43 and the first light-guiding film 33, the second yielding hole 41 is provided on the second light-guiding film 43, the at least two second protrusions 44 are circumferentially arrayed on the outer circumference of the second light-guiding film 43, outer circumferential sides of the at least two second protrusions 44 are respectively disposed opposite to a light exit surface of the edge-type light source 2, and the second bright area 42 is a second dot area formed by a plurality of uniformly-distributed light-guiding dots.

Furthermore, the first light-blocking layer is disposed on the outer circumference of the second light-guiding film 43 (not including the outer circumference of the second protrusions 44).

Furthermore, the first light-blocking layer is a light-sealing ink layer or a silver plating layer or a zinc plating layer. The light-sealing ink layer is used to block light to avoid light leakage or light ingress at the outer circumference of the first light-guiding film 33 or the second light-guiding film 43; the silver plating layer or the zinc plating layer is used not only to block light but also to reflect light irradiated on the outer circumference of the first light-guiding film 33 or the second light-guiding film 43, or used to reflect light exiting from the interior of the first light-guiding film 33 or second light-guiding film 43 towards the outer circumference back to the interior of the first light-guiding film 33 or second light-guiding film 43, to improve the light utilization efficiency.

Furthermore, a second light-blocking layer is disposed on an overlapping area of the first light exit structure 3 relative to the second light exit structure 4.

Furthermore, the second light-blocking layer is a light-sealing ink layer or a silver plating layer or a zinc plating layer or a second light-shielding paper.

Furthermore, referring to FIG. 1, the backlight module further comprises a first light-shielding paper 5 for preventing the edge-type light source 2 from emitting light perpendicular to the circuit board 1 and causing lamp burn-out phenomenon, the first light-shielding paper 5 is disposed on the second light exit structure 4, and the first light-shielding paper 5 is provided with a third yielding hole 51 for receiving the second bright area 42.

Furthermore, referring to FIG. 1 and FIG. 2, the backlight module further comprises a third light exit structure 6, the third light exit structure 6 is disposed between the first light exit structure 3 and the circuit board 1, the light-incident ends of the first light exit structure 3 and the second light exit structure 4 are disposed staggered from the light-incident ends of the third light exit structure 6, colors of the first light exit structure 3 and the second light exit structure 4 are both different from that of the third light exit structure, the third light exit structure 6 is provided with a third bright area 61, the third bright area 61 is located in the first yielding hole 31, and the edge-type light sources 2 are disposed at the outer circumference of the light-incident ends of the third light exit structure 6.

Furthermore, referring to FIG. 1 and FIG. 2, the third light exit structure 6 includes a third light-guiding film 62 and at least two third protrusions 63 of an integrally injection-molded structure, the at least two third protrusions 63 are respectively light-incident ends of the third light exit structure 6, the at least two second protrusions 44 are circumferentially arrayed on the outer circumference of the second light-guiding film 43, outer circumferential sides of the at least two third protrusions 63 are respectively disposed opposite to a light exit surface of the edge-type light source 2, the third bright area 61 is disposed on the third light-guiding film 62, and the third bright area 61 is a third dot area formed by a plurality of uniformly-distributed light-guiding dots.

Furthermore, the first light-blocking layer is disposed on the outer circumference of the third light-guiding film 62 (not including the outer circumference of the third protrusions 63).

Furthermore, a second light-blocking layer is disposed on an overlapping area of the third light exit structure 6 relative to the first light exit structure 3.

Furthermore, the edge-type light sources 2 are side-emitting LED beads.

Furthermore, the circuit board 1 is provided with a fourth yielding hole which is disposed coaxially with the first yielding hole 31. When the backlight module according to the present disclosure is disposed at an outer circumference of a fingerprint module or a start button, the fourth yielding hole is used to avoid the fingerprint module or start button. When the backlight module according to the present disclosure is not disposed at the outer circumference of the fingerprint module or the start button and only performs a simple lighting function, the circuit board 1 may not be provided with the fourth yielding hole.

Figure 3:
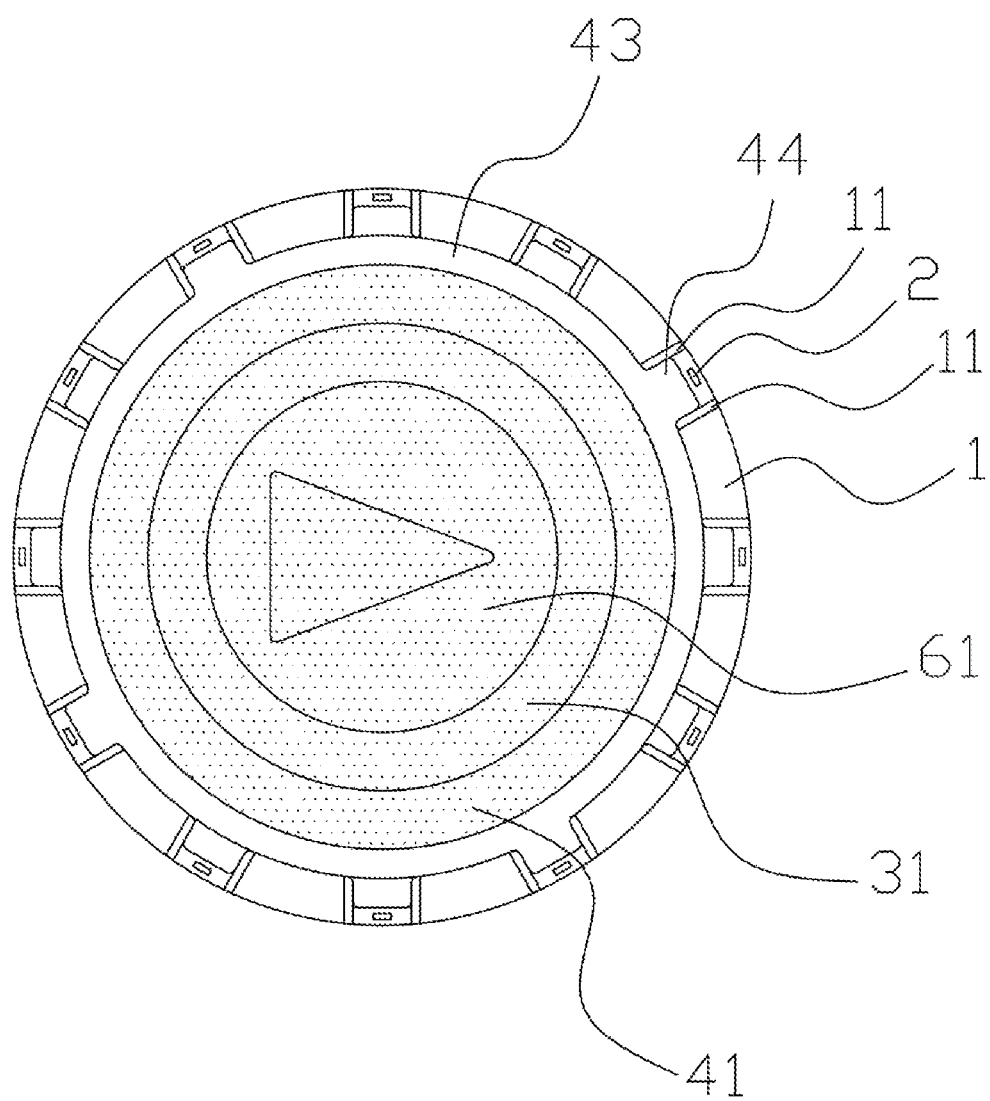
FIG. 3 is a top view of a backlight module of an indicator lamp according to a second embodiment of the present disclosure.

Furthermore, referring to FIG. 3, the circuit board 1 is provided with first bosses 11, top surfaces of the first bosses 11 flush with a top surface of the second light exit structure 4, and the first bosses 11 are symmetrically disposed on both sides of the light-incident end of the first light exit structure 3 and form a first snap-fitting position, and the first bosses 11 are symmetrically disposed on both sides of the light-incident end of the second light exit structure 4 and form a second snap-fitting position.

Furthermore, referring to FIG. 3, the circuit board 1 is provided with second bosses, top surfaces of the second bosses flush with a top surface of the second light exit structure 4, and the second bosses are symmetrically disposed on both sides of the light-incident end of the third light exit structure 6 and form a third snap-fitting position.

A manual alignment and assembling speed of the first light exit structure 3, the second light exit structure 4 and the third light exit structure 6 are respectively improved through the first snap-fitting position, second snap-fitting position and third snap-fitting position; when the first light-shielding paper 5 is disposed on the second light exit structure 4, the first snap-fitting position, second snap-fitting position and third snap-fitting position can form a receiving chamber for receiving the edge-type light source 2.

With the light-incident ends of the first light exit structure 3 and second light exit structure 4 being provided, the edge-type light sources 2 can be disposed on the outer circumference of the light-incident ends of the first light exit structure 3 and second light exit structure 4, thereby reducing the thickness of the backlight module according to the present disclosure. As compared with the prior art, the edge-type light sources 2 illuminate the light-incident ends of the first light exit structure 3 or second light exit structure 4 so that the first bright area 32 or second bright area 42 emits light and displays different colors to perform an indication function, thereby avoiding concurrent operation of all edge-type light sources 2, slowing down the consumption speed of the service life of the edge-type light sources 2 and prolonging the maintenance cycle; in the inspection process before shipment, the edge-type light sources 2 may further enable the first bright area 32 and second bright area 42 to emit light simultaneously by simultaneously illuminating the light-incident ends of the first light exit structure 3 and second light exit structure 4, thereby achieving completion of the inspection process at one time, improving the inspection efficiency and reducing the time and costs of the manufacturer.

What are described above is not intended to impose any limitation to the technical scope of the present disclosure. Any amendments, equivalent variations and modifications made to the above embodiments according to the technical essence of the present disclosure, and all fall within the scope of the technical solutions of the present disclosure.

What is claimed is:

1. A backlight module of an indicator lamp, wherein the backlight module comprises a circuit board, edge-type light sources, a first light exit structure and a second light exit structure, the edge-type light sources are electrically connected to the circuit board, the edge-type light sources are disposed at an outer circumference of light-incident ends of the first light exit structure and the second light exit structure, respectively, the edge-type light sources are used to illuminate the light-incident ends of the first light exit structure and the second light exit structure, respectively, the light-incident ends of the first light exit structure and the second light exit structure are disposed staggered, colors of the first light exit structure and the second light exit structure are different, the first light exit structure is disposed on the circuit board, the first light exit structure is provided with a first yielding hole, the first light exit structure is provided with a first bright area, the second light exit structure is disposed on the first light exit structure, the second light exit structure is provided with a second yielding hole for receiving the first bright area, and the second light exit structure is provided with a second bright area.

2. The backlight module of an indicator lamp according to claim 1, wherein the first light exit structure comprises a first light-guiding film and at least two first protrusions which are of an integral structure, the at least two first protrusions are respectively light-incident ends of the first light exit structure, the first yielding hole is provided on the first light-guiding film, the at least two first protrusions are circumferentially arrayed on the outer circumference of the first light-guiding film, outer circumferential sides of the at least two first protrusions are respectively disposed opposite to a light exit surface of the edge-type light sources, and the first bright area is a first dot area formed by a plurality of uniformly-distributed light-guiding dots.

3. The backlight module of an indicator lamp according to claim 1, wherein the second light exit structure comprises a second light-guiding film and at least two second protrusions which are of an integral structure, the at least two second protrusions are respectively the light-incident ends of the second light exit structure, the second yielding hole is provided on the second light-guiding film, the at least two second protrusions are circumferentially arrayed on the outer circumference of the second light-guiding film, outer circumferential sides of the at least two second protrusions are respectively disposed opposite to a light exit surface of the edge-type light sources, and the second bright area is a second dot area formed by a plurality of uniformly-distributed light-guiding dots.

4. The backlight module of an indicator lamp according to claim 1, wherein the backlight module further comprises a first light-shielding paper, the first light-shielding paper is disposed on the second light exit structure, and the first light-shielding paper is provided with a third yielding hole for receiving the second bright area.

5. The backlight module of an indicator lamp according to claim 1, wherein the backlight module further comprises a third light exit structure, the third light exit structure is disposed between the first light exit structure and the circuit board, the light-incident ends of the first light exit structure and the second light exit structure are disposed staggered from the light-incident end of the third light exit structure, colors of the first light exit structure and the second light exit structure are both different from that of the third light exit structure, the third light exit structure is provided with a third bright area, the third bright area is located in the first yielding hole, and the edge-type light sources are disposed at the outer circumference of the light-incident ends of the third light exit structure.

6. The backlight module of an indicator lamp according to claim 5, wherein the third light exit structure comprises a third light-guiding film and at least two third protrusions which are of an integral structure, the at least two third protrusions are respectively light-incident ends of the third light exit structure, the at least two third protrusions are circumferentially arrayed on the outer circumference of the third light-guiding film, outer circumferential sides of the at least two third protrusions are respectively disposed opposite to a light exit surface of the edge-type light sources, the third bright area is disposed on the third light-guiding film, and the third bright area is a third dot area formed by a plurality of uniformly-distributed light-guiding dots.

7. The backlight module of an indicator lamp according to claim 1, wherein the edge-type light sources are side-emitting LED beads.

8. The backlight module of an indicator lamp according to claim 1, wherein the circuit board is provided with a fourth yielding hole which is disposed coaxially with the first yielding hole.

9. The backlight module of an indicator lamp according to claim 1, wherein the circuit board is provided with first bosses, top surfaces of the first bosses flush with a top surface of the second light exit structure, and the first bosses are symmetrically disposed on both sides of the light-incident end of the first light exit structure and form a first snap-fitting position, and the first bosses are symmetrically disposed on both sides of the light-incident end of the second light exit structure and form a second snap-fitting position.

10. The backlight module of an indicator lamp according to claim 6, wherein the circuit board is provided with second bosses, top surfaces of the second bosses flush with a top surface of the second light exit structure, and the second bosses are symmetrically disposed on both sides of the light-incident end of the third light exit structure and form a third snap-fitting position.

\* \* \* \* \*